(12) United States Patent
Pitz et al.

(10) Patent No.: US 7,512,645 B2
(45) Date of Patent: Mar. 31, 2009

(54) SYSTEM AND METHOD FOR GENERATING PSEUDORANDOM NUMBERS

(75) Inventors: Jeanne Krayer Pitz, Richardson, TX (US); Alexander Teutsch, Murphy, TX (US); Nicole Cunningham, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 718 days.

(21) Appl. No.: 10/804,750

(22) Filed: Mar. 19, 2004

(65) Prior Publication Data

US 2005/0207574 A1 Sep. 22, 2005

(51) Int. Cl.
*G06F 1/02* (2006.01)
(52) U.S. Cl. .................. 708/250; 708/252; 708/254
(58) Field of Classification Search .......... 708/250–256
See application file for complete search history.

(56) References Cited

U.S. PATENT DOCUMENTS

| 5,452,358 | A | * | 9/1995 | Normile et al. ............... 380/42 |
| 5,875,249 | A | * | 2/1999 | Mintzer et al. ............... 280/54 |
| 7,120,696 | B1 | * | 10/2006 | Au et al. ...................... 708/254 |
| 2004/0184609 | A1 | * | 9/2004 | Umeno ......................... 380/46 |
| 2005/0050121 | A1 | * | 3/2005 | Klein et al. .................. 708/250 |
| 2005/0050122 | A1 | * | 3/2005 | Blumenthal et al. ......... 708/250 |
| 2005/0195976 | A1 | * | 9/2005 | Yacobi et al. ............... 380/210 |

* cited by examiner

*Primary Examiner*—Tan V Mai
(74) *Attorney, Agent, or Firm*—William B. Kempler; Frederick J. Telecky, Jr.; Wade J. Brady, III

(57) ABSTRACT

A system that has a pseudorandom number generator and a mapping system. The pseudorandom number generator generates a random number that is mapped by the mapping system to an output value that is selected from a set of predetermined output values. To increase the randomness of the sequence of numbers generated by the pseudorandom number generator, a tap and/or seed value of the pseudorandom number generator can be varied.

8 Claims, 3 Drawing Sheets

US 7,512,645 B2

SYSTEM AND METHOD FOR GENERATING PSEUDORANDOM NUMBERS

TECHNICAL FIELD

The present invention is directed to the generation of pseudorandom numbers.

BACKGROUND OF THE INVENTION

Pseudorandom numbers have many applications in communications, testing, and radar systems. Pseudorandom numbers are usually generated as a sequence of numbers. When generating pseudorandom numbers, it is desirable that each pseudorandom number is maximal (random and doesn't repeat often) and uniform, (each number in the sequence occurs with the same probability).

A linear feedback shift register (LFSR) can be used for generating pseudorandom number sequences. The typical LFSR is a serial shift register that uses feedback taps, such as exclusive-or gates, at one or more of the memory cells to generate the pseudorandom states. If the LFSR is initialized in a non-zero state, it cycles through a sequence of states and eventually returns to its initial state. The sequence can be varied by changing the feedback taps, or by using a different seed value.

One problem that can occur with an LFSR is when the LFSR does not run its full sequence. Over the entire length of the sequence of the LFSR, the distribution will be uniform as all values will eventually occur. However, for a shorter subsequence, the codes generated can lack uniformity. Long strings of 0's or 1's can occur in a subsequence of less than the maximal sequence, causing non-uniformity. For example, a three bit LFSR can be used to pseudo-randomly generate two numbers [0,1] by taking the value of the least significant bit. For the full eight number sequence, zero will appear four times, and one will appear four times. However, for less than the full sequence, e.g. a six number subsequence, it is possible that either value (0 or 1) can appear twice as often as the other, depending on the seed used.

Another problem with using an LFSR is that a value produced by an LSFR cannot be used directly when the modulo is not a power of 2. This is because there will be values produced by the LFSR that are not to be included in the sequence. For example, if it is desired to generate a three number sequence, a two bit, or larger, LFSR can be used. However, the two-bit LFSR has four possible values; therefore, there can be a value generated in the sequence that cannot be used.

SUMMARY OF THE INVENTION

The present invention is directed to systems and methods for generating pseudorandom numbers. The system and method can provide pseudorandom numbers that are maximal and uniform, even when generating a subsequence that is less than the maximal sequence.

In accordance with an aspect of the present invention, there is a system for generating a pseudorandom number. The system comprises a pseudorandom number generator and a mapping system. The pseudorandom number generator generates a random number that is mapped by the mapping system to an output value that is selected from a set of predetermined output values. To increase the randomness of the number generated by the pseudorandom number generator, a tap and/or seed value of the pseudorandom number generator can be varied. For uniformity, the mapping system associates numbers generated by the pseudorandom number generator to an output value from the set of possible output values.

Another aspect of the present invention is directed to a system for generating a pseudorandom delay. The system can generate a fine delay and/or a coarse delay, where the fine delay is a fractional portion of the coarse delay. For generating the coarse delay, a linear feedback shift register (LFSR) is used for generating a pseudorandom number. The LFSR has at least one variable tap and a variable seed value. A mapping system is used to assign each pseudorandom number value to a corresponding coarse delay value. The coarse delay value is associated with an interval, the interval comprising a plurality of pseudorandom numbers from a plurality of substantially equal intervals. The plurality of substantially equal intervals is based on the range of the LFSR divided by the number of elements in the set of coarse delay values. The system can use another LFSR to generate a fine delay if desired. The LFSR for generating the fine delay can also have a variable tap and/or a variable seed value. Alternatively, the mapping system can be suitably adapted to assign intervals a coarse delay value and a fine delay value.

Another aspect of the present invention is directed to a system for generating a randomized delay for a plurality of devices. Each device has an associated delay. Each device has a pseudorandom number generator for generating a sequence of pseudorandom numbers, where each pseudorandom number of the sequence of pseudorandom numbers corresponding to a delay factor. The pseudorandom number generator comprises a pseudorandom number generator for generating the sequence of pseudorandom numbers, a mapping system for mapping each of the pseudorandom numbers to a one of a discrete number of delay values, and a system for pseudo-randomly generating at least one of a tap setting value and a seed value at the beginning of each sequence of pseudorandom numbers.

Another aspect of the present invention is for a method comprising pseudo-randomly generating a number within a predefined range of a plurality of numbers and mapping the pseudo-randomly generated number to an output value. The output value is based on an interval associated with the pseudo-randomly generated number.

BRIEF DESCRIPTION OF THE DRAWINGS

The foregoing and other aspects of the present invention will become apparent to those skilled in the art to which the present invention relates upon reading the following description with reference to the accompanying drawings.

DETAILED DESCRIPTION

The present invention is directed to a system and method for generating pseudorandom numbers and sequences of pseudorandom numbers. The system comprises a pseudorandom number generator and a mapping system. The pseudorandom number generator generates a random number that is mapped by the mapping system to an output value that is selected from a set of predetermined output values. To increase the randomness of the output sequence generated by the pseudorandom number generator, a tap and/or seed value of the pseudorandom number generator can be varied. The method comprises pseudo-randomly generating a number and mapping the pseudo-randomly generated number to an output value. The output value is based on the number's interval.

Figure 1:
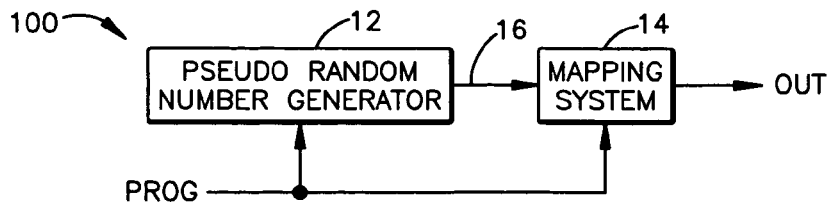
FIG. 1 illustrates a system for generating a pseudorandom number in accordance with an aspect of the present invention.

Referring to FIG. 1, there is illustrated a system 100 in accordance with an aspect of the present invention. The system 100 comprises a pseudorandom number generator 12 that produces a pseudorandom number that is sent along path 16 to a mapping system 14. The mapping system 14 maps the pseudorandom number to an output value OUT selected from a set of output values.

A programmable input PROG is connected to the pseudorandom number generator 12 and the mapping system 14. The programmable input PROG can initialize the pseudorandom number generator. The programmable input PROG can also select a set of output values for the mapping system.

The pseudorandom number generator can include a linear feedback shift register (LFSR) (not shown). An LFSR has at least one tap and an initial non-zero seed value. The tap determines the sequence of the numbers generated by the pseudorandom number generator. When using the same seed value, by changing the taps, the sequence of numbers generated will be different. For example, an LFSR can have exclusive or (XOR) gates coupled to one or more memory cells for taps. The next value of the memory cell of the LFSR is the value shifted in exclusive or with a value from another memory cell. To increase the randomness of the sequence, the taps can be set pseudo-randomly, such as from a set of predetermined length maximal taps, by using another pseudorandom number generator. The seed value is the first value, or starting value for the pseudorandom number generator. Changing the seed value will also change the sequence of numbers generated by the pseudorandom number generator. To increase the randomness of the sequence, seed values can be selected by another pseudorandom number generator.

The LFSR will then pseudo-randomly produce a set of numbers until all of the numbers in a sequence have been generated, whereupon the LFSR will return to its initial value. The sequence can be varied by changing the tap that is moving it to another memory cell of the LFSR, or by changing the number of taps used by the LFSR. The sequence can also be changed by changing the seed value. The tap and/or seed value can be changed pseudo-randomly.

By using pseudorandom methods for setting the tap and seed value for a pseudorandom number generator, smaller and less expensive components can be used. For example, a 12 bit LFSR can have up to 64 different tap values for generating maximal sequences, which can be pseudo-randomly selected by a 6 bit LFSR. Another 12 bit LFSR can be used to pseudo-randomly select a seed value. This results in a randomness of $2^{12}*2^{6}*2^{12}$ or $2^{30}$. Thus, a 12 bit LFSR, using a 6 bit LFSR to select taps and another 12 bit LFSR to select seed values, can have the same effective randomness as a 30 bit LFSR.

The mapping system 14 maps a pseudorandom number to an output value OUT selected from a set of output values. An aspect of the mapping system 14 is to produce a substantially uniform set of output values, even for subsequences that are less than maximal length. The programmable input PROG can be used to specify the number of possible elements for OUT. Mapping system 14 can be implemented in hardware, software, or a combination of hardware and software. For example, an eleven bit LFSR (not shown) can be used to generate pseudorandom values that are to be mapped to a set of output values, wherein the number of output elements varies from 2 to 9 elements. The mapping system 14 can assign pseudorandom numbers to an output value by dividing the range of the pseudorandom number generator by the number of possible output elements, creating a group of substantially equal intervals. Each interval is assigned a range of pseudorandom numbers.

Table 1 shows an example of how mapping system 14 can map different sets of output values OUT. The output values OUT can be selected with the programmable input PROG. Each setting for PROG specifies a set of output elements (e.g. a number of different ranges of pseudorandom numbers). For example, when PROG is set to 000 the output elements is {0,1}, a set with two elements, and when PROG is set to 101 the set of output elements is {0,1,2,3,4,5,6}, a set with seven elements.

TABLE 1

| PROG | set of output elements (OUT) | number of elements |
|------|------------------------------|--------------------|
| 000  | {0, 1}                       | 2                  |
| 001  | {0, 1, 2}                    | 3                  |
| 010  | {0, 1, 2, 3}                 | 4                  |
| 011  | {0, 1, 2, 3, 4}              | 5                  |
| 100  | {0, 1, 2, 3, 4, 5}           | 6                  |
| 101  | {0, 1, 2, 3, 4, 5, 6}        | 7                  |
| 110  | {0, 1, 2, 3, 4, 5, 6, 7}     | 8                  |
| 111  | {0, 1, 2, 3, 4, 5, 6, 7, 8}  | 9                  |

Once a set of output elements has been specified by PROG, the mapping system 14 creates a set of substantially equal intervals by dividing the maximum range of the pseudorandom number generator 12 with the number of elements. For example, Table 2 shows a size of the substantially equal intervals for the set of output values specified in Table 1 using a twelve bit LFSR. The range of psuedo-random numbers for a twelve bit LFSR is 1-4095.

TABLE 2

| PROG | Number of elements | Size of interval |
|------|--------------------|------------------|
| 000  | 2                  | 2048             |
| 001  | 3                  | 1365             |
| 010  | 4                  | 1024             |
| 011  | 5                  | 819              |
| 100  | 6                  | 683              |
| 101  | 7                  | 585              |
| 110  | 8                  | 512              |
| 111  | 9                  | 455              |

Mapping system 14 provides a substantially uniform distribution for smaller, e.g. less than maximal, sequences of pseudorandom numbers. Mapping system 14, assigns each pseudorandom number an output value based on the interval of the pseudorandom number. For example, using Table 1, when PROG is 000, there are two elements {0,1}, resulting in two substantially equal intervals of 2048 numbers. So, if the number generated by the pseudorandom number generator is between 1-2047 it is assigned an output value of 0, and if the number generated by the pseudorandom number generator is between 2048-4095 it is assigned an output value of 1.

The intervals created by the mapping system 14 may not always be equal. When the number of elements of the output set is not a power of 2, for example, the size of the interval will not be a whole number. For example, for the case of 6 elements, for a 12 bit random number, each interval would be 682.67. One possible solution would be to use the least significant bit from a small LFSR to break the set in half ({0,1,2} and {3,4,5}) and then a 10 bit LFSR can be assigned groups of 3 to select the value from the selected half. Another alternative is to create intervals that are substantially equal, except that one additional pseudorandom number value would be in the included in one or more intervals. For a large pseudorandom number generator, such as a 12 bit LFSR, the additional pseudorandom number value corresponds to a small difference.

Using the example given in Table 1, a worse case scenario exists for the smallest intervals, when PROG is 111, where there are 9 elements, and each interval has a range of 455 numbers. However, since 9×455=4095, thus there would be one pseudorandom number that would be unassigned. Consequently, one interval needs to include 456 numbers. For example, making the first interval one larger, the first interval could include 1-455, the second interval would include 456-910, the third interval would include 911-1365, the fourth interval would include 1366-1820, the fifth interval would include 1821-2275, the sixth interval would include 2276-2730, the seventh interval would include 2731-3185, the eighth interval would include 3186-3640 and the ninth interval would include 3641-4095. This results in the first interval being assigned 11.11% of the possible numbers generated by the pseudorandom number generator while the remaining intervals are assigned 11.08% of the possible numbers generated by the pseudorandom number generator, or a 0.03% difference. While the preceding example increased the size of the first interval, any of the intervals can be adjusted.

Figure 2:
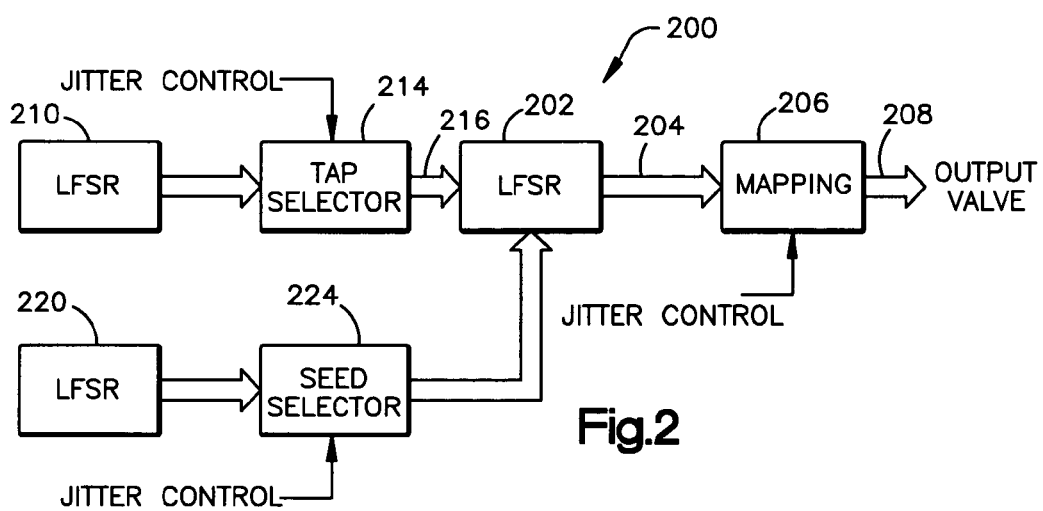
FIG. 2 is a block diagram that illustrates a pseudorandom number generating system in accordance with an aspect of the present invention.

FIG. 2 is a block diagram that illustrates a pseudorandom number generating system 200 in accordance with an aspect of the present invention. The system includes an LFSR 202 is used to produce a pseudorandom number that is sent along path 204 to the mapping system 206. The mapping system 206 maps the pseudorandom number to an output value 208.

The taps of LFSR 202 can be set by tap selector 214. For example, for a 12 bit LFSR, there can be 64 possible maximal length tap settings. To increase the randomness of LFSR 202, an additional LFSR 210 can be utilized by tap selector 214 to pseudo-randomly set the taps of LFSR 202. LFSR 210 can be a smaller LFSR (e.g. having fewer bits) than LFSR 202. For example, if LFSR 202 is a 12 bit LFSR with 64 tap settings, a 6 bit LFSR can be used for LFSR 210.

The system 200 can also include a seed selector 224 to set the seed of LFSR 202. The seed selector 224 selects between an external value and a value generated internally, such as by another LFSR 220. The selected value is applied to provide a seed for LFSR 202.

A control, JITTER CONTROL can be employed to control the operation of the system 200. JITTER CONTROL can correspond to a programmable value that is provided to tap selector 214, seed selector 224 and mapping system 206. JITTER CONTROL can command tap selector 214 to set the taps of LFSR 202 when a new sequence or a new number is about to be generated. Similarly, JITTER CONTROL can command seed selector 224 to set the seed of LFSR 202 when a new sequence or a new number is about to be generated. JITTER CONTROL can also be provided to mapping system 206 to set the number of possible elements in the set of desired output values.

In operation, to pseudo-randomly generate a number, or a sequence of numbers, JITTER CONTROL commands tap selector 214 to set the taps of LFSR 202. LFSR 210 provides a pseudorandom number, which is used by tap selector 214 to set the taps of LFSR 202. JITTER CONTROL also commands seed selector 224 to set a seed value to LFSR 202. Seed selector 224 obtains a pseudorandom number from LFSR 220 and the seed value of LFSR 202 is based on the pseudorandom number from LFSR 220. JITTER CONTROL tells the mapping system 206 how many elements are in the set of output values. Mapping system 206 then creates a plurality of substantially equal intervals based on the range of LFSR 202 and the number of desired output elements. Mapping system 206 then assigns output values to pseudorandom numbers from LFSR 202. LFSR 202 then generates a pseudorandom number that is sent along path 204 to mapping system 206. When mapping system 206 receives a pseudorandom number from LFSR 202, mapping system 206 determines which interval the pseudorandom number belongs to and then produces an output value accordingly.

Figure 3:
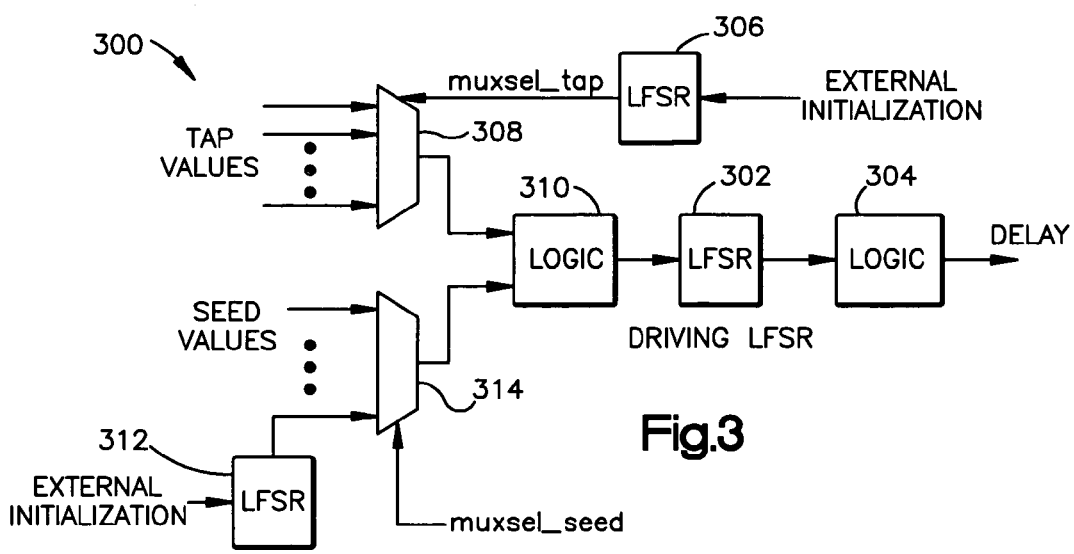
FIG. 3 is a circuit diagram for generating a pseudorandom delay in accordance with an aspect of the present invention.

FIG. 3 depicts a circuit diagram for a circuit 300 for generating a pseudorandom delay in accordance with an aspect of the present invention. LFSR 302 provides a pseudorandom number to mapping logic 304. Mapping logic 304 then produces a delay value based on the pseudorandom number produced by LFSR 302. Mapping logic 304 can be implemented in hardware, software, or a combination of hardware and software.

Tap Select LFSR 306 sets the taps of LFSR 302. Tap Select LFSR 306 receives external initialization. The external initialization can be a seed value for LFSR 306 or an instruction to shift to the next value for example. The output, muxsel_tap, of tap selector LFSR 306 is used to control multiplexer 308. Multiplexer 308 is used for selecting one of a plurality of tap values based on muxsel_tap. The output of multiplexer 308 is sent to logic 310 to implement the selected tap values to LFSR 302. Logic 310 can store tap and seed values from multiplexers 308 and 314 respectively. Logic 310 can be implemented in hardware, software or a combination of hardware and software.

Seed LFSR 312 and one or more external seed values are provided as inputs of multiplexer 314 and sets the initial seed value of LFSR 302. Seed select LFSR 312 can receive an external initialization. The external initialization can be a seed value for LFSR 312 or an instruction to shift to a next value. The muxsel_seed is provided by an external source to control multiplexer 314 to select a corresponding seed value to apply to LSFR 302. Thus, the seed value can be selected from one or the external seed values or the internally generated pseudo random seed from the LSFR 312. The output of multiplexer 314 is sent to logic 310 to implement the selected seed value to LFSR 302. LFSR 302 thus employs an output signal(s) from logic 310 to generate a corresponding pseudorandom number. The effective randomness of the output sequence can be varied by selectively changing the tap values and seed values provided to logic 310.

Figure 4:
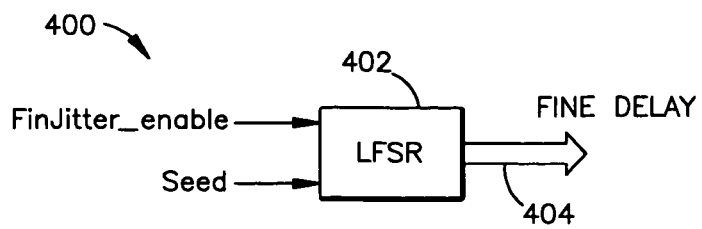
FIG. 4 illustrates a block diagram of a system using a linear feedback shift register for generating a fine delay.

FIG. 4 illustrates a block diagram of a system 400 using a linear feedback shift register for generating a fine delay. Fine delay can correspond to a fractional portion of the coarse delay. The system 400 can be used with the circuit 300 of FIG. 3 or the system 200 of FIG. 2, where the circuit 300 of FIG. 3, or system 200 of FIG. 2, produces the coarse delay (e.g. whole clock cycles or integer multiples thereof), and the system 400 produces the fine delay (e.g. a fractional part of a full clock cycle).

The system comprises LFSR 402. LFSR 402 receives a seed value via the Seed input. The Seed input can be programmed into LFSR 402 or can be input manually. FinJitter_ enable is used to activate LFSR 402 to produce a value, which is output at 404. The size of LFSR 402 depends on the desired number of output values. For example, if a 1/16 fine value is desired, then a 4 bit LFSR can be used. Alternatively, a larger LFSR can be used with a mapping system (not shown).

As an example, system 400 can be used to generate a randomized delay, where the coarse delay represents a clock cycle, and the fine delay represents a factional portion of a clock cycle, which for this example is 1/16 a clock cycle or about 0.83 nanoseconds. Table 3 below shows a set of possible delays for each value that can be provided by LFSR 402 when enabled by control input FinJitter_enable. The delay can be broken down into a fine delay component from 0 . . . 15, representing x/16 fractional portions of a whole clock cycle, and a coarse delay component in terms of whole clock cycles. Using Table 3 for example, for control value 010 there can be {0,1,2} clock cycles of delay plus {0 . . . 15} fine delay steps. By combining the fine delay component and the coarse delay component independently, a delay value from 0 . . . 47*0.83 ns can be produced.

TABLE 3

| CONTROL | set of possible delays | number clock cycles | number of elements |
|---|---|---|---|
| 000 | {0, 1, 2, . . . , 15}*.83 ns | <1 | 16 |
| 001 | {0, 1, 2, . . . , 31}*.83 ns | <2 | 32 |
| 010 | {0, 1, 2, . . . , 47}*.83 ns | <3 | 48 |
| 011 | {0, 1, 2, . . . , 63}*.83 ns | <4 | 64 |
| 100 | {0, 1, 2, . . . , 79}*.83 ns | <5 | 80 |
| 101 | {0, 1, 2, . . . , 95}*.83 ns | <6 | 96 |
| 110 | {0, 1, 2, . . . , 111}*.83 ns | <7 | 112 |
| 111 | {0, 1, 2, . . . , 127}*.83 ns | <8 | 128 |

As an alternative to the system 400 of FIG. 4, a system 200 as described in FIG. 2 or a circuit 300 as described in FIG. 3 can be used to generate the fine delay. However, if the randomness of the coarse delay is sufficient and the randomness of the fine delay is not as critical, the system 400 of FIG. 4 can be used in order to minimize the number of components. Another option would be to use a system 200 as described in FIG. 2 or a circuit 300 as described in FIG. 3 to generate both the coarse and fine delay. The mapping system (e.g. mapping system 14 (FIG. 1), 206 (FIG. 2) or 304 (FIG. 3)) would then define more intervals, where each interval would be assigned a corresponding fine delay component value and a coarse delay component value. However, because there would be a substantial increase in the number of intervals needed by the mapping system, a larger pseudorandom number generator may be needed.

Figure 5:
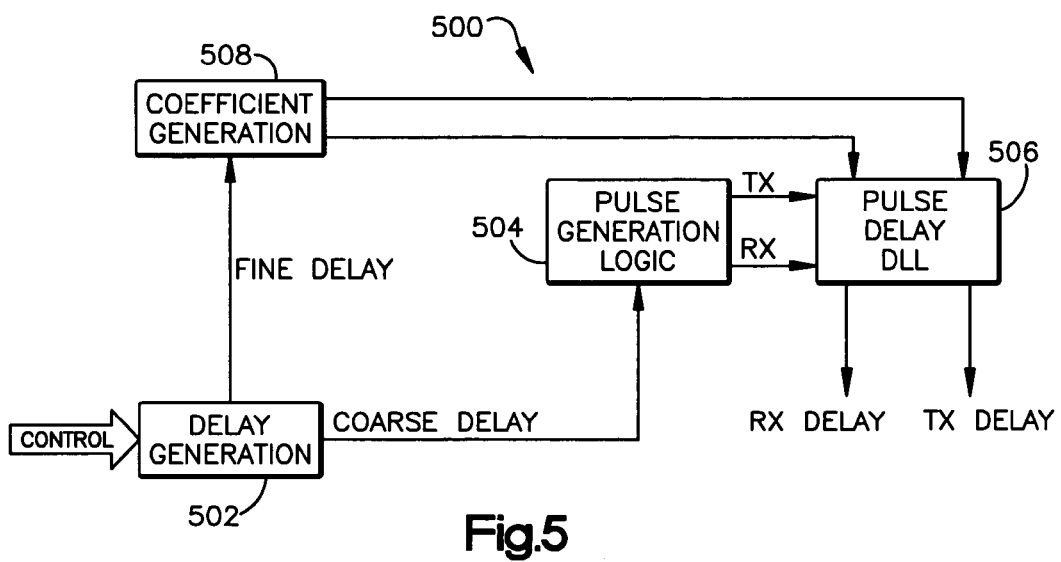
FIG. 5 is a block diagram that illustrates a system for generating randomized transmit and receive delays in accordance with an aspect of the present invention.

FIG. 5 is a block diagram that illustrates a system 500 for generating randomized transmit and receive delays in accordance with an aspect of the present invention.

Delay generation 502 is used to generate a pseudorandom coarse delay value and/or a pseudorandom fine delay value. Delay generation 502 can include a system 200 as described in FIG. 2 or a circuit 300 as described in FIG. 3 for generating the coarse delay component and/or the fine delay component. Delay generation 502 can also employ a system 400 as described in FIG. 4. Delay generation 502 receives an input CONTROL for defining the parameters of the desired randomized delays. For example, CONTROL can specify whether a fine and coarse delay value are desired, or if only one of a coarse delay value or a fine delay value is desired.

The coarse delay value is sent from delay generation to pulse generation logic 504. Pulse generation logic 504 generates a transmit delay TX value and a receive delay value RX based on the coarse delay value. Pulse generation logic 504 can be implemented in hardware, software or a combination of hardware and software.

Coefficient generation 508 is responsible for generating the fine value coefficients used by pulse delay DLL 506 for transmit and receive pulse delays. The fine value coefficients are based on the pseudorandom number provided by pulse generation logic 504. Coefficient generation 508 can be implemented in hardware, software or a combination of hardware and software.

The coarse TX and RX values are sent from pulse generation logic 504 to pulse delay DLL 506. Likewise, fine delay values are sent from coefficient generator 508 to pulse delay DLL 506. Pulse delay DLL 506 performs the actual delays RX DELAY and TX DELAY based on the TX and RX values provided by pulse generation logic 504 and coefficient generation 508.

An aspect of employing random TX DELAY and RX DELAY values is mitigation of overlap in systems employing multiple devices. For example, a radar system (not shown) comprising a plurality of radars, can employ randomized pulse delays to minimize overlap, especially from nearby devices. Each device can operate independently, and by randomly varying the pulses, the possibility of two devices transmitting or receiving at the same time is reduced.

Figure 6:
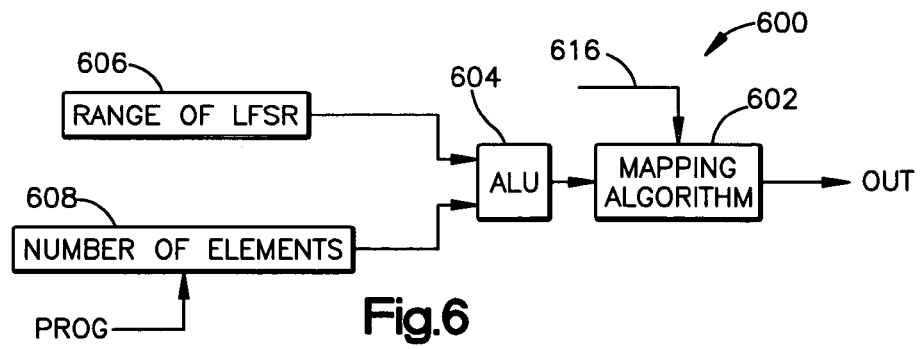
FIG. 6 is a block diagram of a mapping system in accordance with an aspect of the present invention.

FIG. 6 is a block diagram of a mapping system 600 in accordance with an aspect of the present invention. A mapping algorithm 602 receives a pseudorandom number 616. Mapping algorithm 602 also receives an interval size from ALU 604. ALU 604 determines the size of the interval based on the range of the LFSR 606 and the number of elements 608 of the output set. The number of elements 608 can have a programmable input PROG so that variable number elements can be mapped. The output OUT of mapping algorithm 602 is an output value from a set of output values based on pseudorandom number 616.

Mapping algorithm 602 determines substantially equal intervals based on the size of the interval received from ALU 604. ALU 604 determines the size of the substantially equal intervals based on the range of LFSR 606 generating the pseudorandom number and number of elements 608 of the output set. The intervals can be consecutive. For example if using a 12 bit LFSR and the desires number of output elements is two (0,1), if pseudorandom number 16 has a value between 0 and 2047, then OUT is 0, and if pseudorandom number 16 has a value between 2048 and 4095, then OUT is 1.

Figure 7:
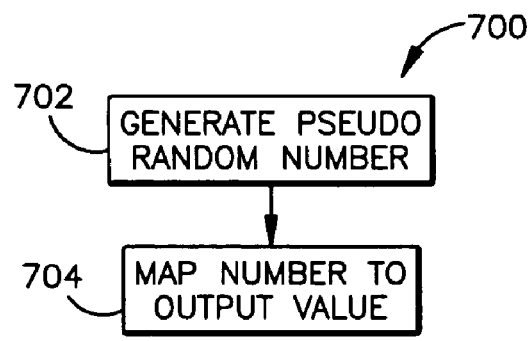
FIG. 7 illustrates a method for generating a pseudorandom number in accordance with an aspect of the present invention.
Figure 8:
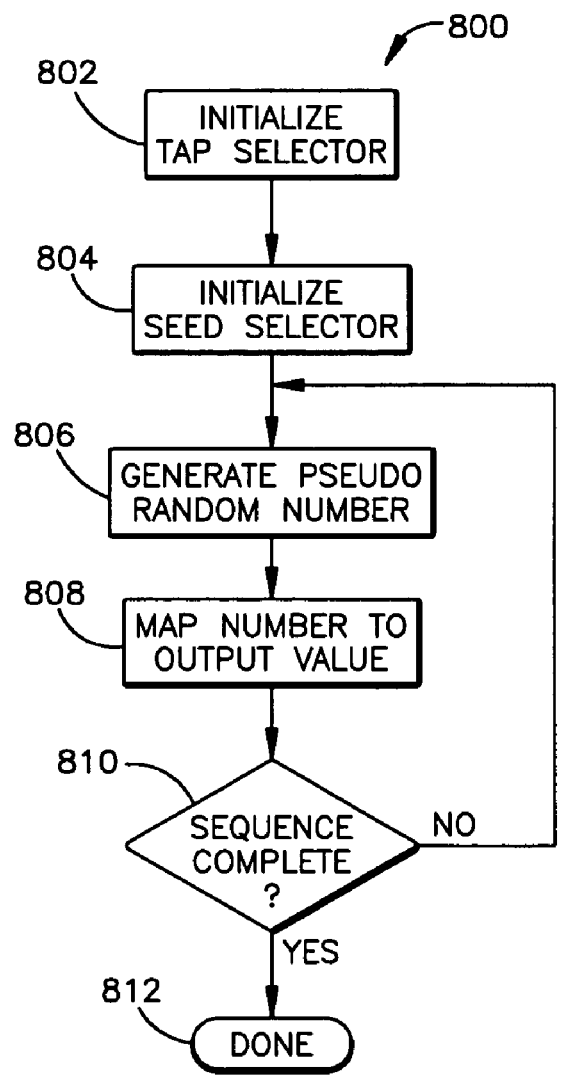
FIG. 8 illustrates a method for generating a pseudorandom sequence of numbers in accordance with an aspect of the present invention.

FIGS. 7 and 8 illustrate methodologies in accordance with an aspect of the present invention. While, for purposes of simplicity of explanation, the methodologies below are shown and described as executing serially, it is to be understood and appreciated that the methodologies are not limited by the order shown, as some aspects may, in accordance with the present invention, occur in different orders and/or concurrently from that shown and described herein. Moreover, not all features shown or described may be needed to implement the methodologies in accordance with the present invention. Additionally, such methodologies can be implemented in hardware (e.g., one or more integrated circuits), software (e.g., running on a DSP or ASIC) or a combination of hardware and software.

FIG. 7 illustrates a method 700 for generating a pseudorandom number in accordance with an aspect of the present invention. At 702, a pseudorandom number is generated. The pseudorandom number can be generated by a LFSR or any other pseudorandom number generator. At 704, the pseudorandom number is mapped to an output value. The mapping provides a uniform distribution for a sequence of pseudorandom numbers.

By mapping, each pseudorandom number value is assigned to an output value from a set of output values. The set of output values can be a smaller set of numbers than the number of possible pseudorandom numbers. For example, the pseudorandom number can be 12 bits or 4095 possible values, and the set of output values can contain two or more values. To map a 12 bit pseudorandom number to two values, pseudorandom number values from 1-2047 can be assigned or associated with the first output value, and pseudorandom number values 2048-4095 can be assigned or associated with the second output value. As described herein, the intervals created by the mapping at 704 may not always be equal. When the number of elements of the output set is not a power of 2, the size of the interval will not be a whole number. Thus, some intervals can be assigned at least one additional number to accommodate rounding errors.

FIG. 8 illustrates a method 800 for generating a pseudorandom sequence of numbers in accordance with an aspect of the present invention. In generating a pseudorandom sequence, it is desirable that the sequence is maximal (the sequence is random and doesn't repeat often) and uniform (each number in the sequence occurs with substantially the same probability over an interval).

Initializing a tap selector is performed at 802. The tap selector is used to select taps of a pseudorandom number generator. The taps determine the sequence of the numbers generated by the pseudorandom number generator. When using the same seed value, by changing taps, different sequences of numbers can be generated. For example, when using an LFSR, the feedback taps are usually exclusive-or (XOR) gates coupled to one or more memory cells. The next value of the memory cell of the LFSR is the value shifted in exclusive-ORed with a value from another memory cell. To further improve the maximal quality of the sequence, the taps can be set pseudo-randomly by using another pseudorandom number generator.

Initializing a seed selector is performed at 804. The seed value is the first value, or starting value for the pseudorandom number generator. Changing the seed value will cause the sequence to start at a different point for the pseudorandom number generator. To further improve the maximal quality of the sequence, seed values can be selected by another pseudorandom number generator.

Generating a pseudorandom number is performed at 806. Because the number is pseudorandom, as opposed to truly random, the value of the pseudorandom number is a function of the tap setting and the seed value. For a typical pseudorandom number generator, once a pseudorandom number has been generated it becomes the seed value for the next number unless the seed of the pseudorandom number generator is initialized again.

At 808, the pseudorandom number generated at 806 is mapped to an output value. The mapping can be performed by determining a set of intervals for the pseudo-randomly generated number by dividing the maximum range for the pseudorandom generator used to generate the pseudo-randomly generated number by the number of elements in the set of desired output values. The mapping system can associate each output value from the set of output values with an interval from the set of intervals.

At 810, it is determined if the sequence is complete. If the sequence is complete (YES) then at 812 the method 800 ends. If the sequence is not done (NO) then processing returns to 806 whereupon the next pseudorandom number is generated. Alternatively, the sequence can return to 802 to change the tap settings for the pseudorandom number generator, and/or the sequence can return to 804 to change the seed value of the pseudorandom number generator.

What has been described above includes examples and implementations of the present invention. Because it is not possible to describe every conceivable combination of components, circuitry or methodologies for purposes of describing the present invention, one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for generating a pseudorandom delay, comprising:
a first linear feedback shift register for generating a pseudorandom number, the first linear feedback shift register comprises at least one tap and a variable seed value; and
a mapping system configured to assign each pseudorandom number value to a corresponding coarse delay value, the coarse delay value associated with an interval from a plurality of substantially equal intervals based on a range of the first linear feedback register and a number of coarse delay values; and a pulse delay circuit coupled to the mapping system for generating a first delay signal for controlling a signal receiver and for generating a second delay signal for controlling a signal transmitter.

2. The system of claim 1, further comprising a tap selector linear feedback shift register to pseudo-randomly set the at least one tap of the first linear feedback shift register.

3. The system of claim 1, further comprising a seed selector linear feedback shift register to pseudo-randomly set the seed value of the first linear feedback shift register.

4. The system of claim 1, further comprising a second linear feedback shift register configured to provide a fine delay value, the fine delay value including a fractional portion of the coarse delay value.

5. The system of claim 4, further comprising a control for selecting an output delay from the group consisting of the coarse delay value, the fine delay value, and a combination of the coarse delay value and the fine delay value.

6. The system of claim 1, mapping system configured to assign each pseudorandom number value to a corresponding coarse delay value and a fine delay value, the fine delay value including a fractional portion of the coarse delay value.

7. A system for generating a randomized delay for a plurality of devices where each device has an associated delay, each device comprising:
a pseudorandom number generator for generating a sequence of pseudorandom numbers, each pseudorandom number of the sequence of pseudorandom numbers corresponding to a delay factor, the pseudorandom number generator comprising:
a pseudorandom number generator for generating the sequence of pseudorandom numbers;
a mapping system for mapping each of the pseudorandom numbers to a one of a discrete number of delay values; and a system for pseudo-randomly generating at least one of a tap setting value and a seed value for each sequence of pseudorandom numbers; and a pulse delay circuit coupled to the mapping system for generating a first delay signal for controlling a signal receiver and for generating a second delay signal for controlling a signal transmitter.

8. The system of claim 7, the pseudorandom number generator further comprising:

a first pseudorandom number generator for generating a coarse delay; and a second pseudorandom number generator for generating a fine delay value, the fine delay value including a fractional portion of the coarse delay value.

* * * * *